United States Patent [19]

Kobayashi et al.

[11] Patent Number: 4,751,007
[45] Date of Patent: Jun. 14, 1988

[54] METHOD FOR FILTERING *BACILLUS SUBTILIS*

[75] Inventors: Takeshi Kobayashi, 4-29, Shimokata-cho, Chikusa-ku, Nagoya-shi, Aichi-ken; Shinji Iijima, 3-3-7, Kitachikusa, Chikusa-ku, Nagoya-shi, Aichi-ken; Toshiro Minami, Nagoya; Shunji Yasuda, Funabashi; Yoshihisa Katoh, Toyota, all of Japan

[73] Assignees: Takeshi Kobayashi; Shinji Iijima, both of Aichi; Toshiba Ceramics Co., Ltd., Tokyo, all of Japan

[21] Appl. No.: 93,649

[22] Filed: Sep. 8, 1987

[30] Foreign Application Priority Data

Mar. 27, 1987 [JP] Japan .................. 62-73320

[51] Int. Cl.$^4$ .................................. B01D 37/00
[52] U.S. Cl. ........................... 210/791; 210/767; 210/779; 210/805; 435/261; 435/803
[58] Field of Search .............. 210/767, 779, 791, 797, 210/798, 805, 490, 496, 497.01, 510.1; 435/261, 803, 839

[56] References Cited

U.S. PATENT DOCUMENTS

| 4,088,576 | 5/1978 | Mott | 210/510.1 |
| 4,105,804 | 8/1978 | Terui et al. | 435/839 |
| 4,278,544 | 7/1981 | Takashima | 210/510.1 |
| 4,420,398 | 12/1983 | Castino | 435/803 |
| 4,692,411 | 9/1987 | Ghose | 435/261 |

*Primary Examiner*—Ivars Cintins
*Attorney, Agent, or Firm*—Wegner & Bretschneider

[57] ABSTRACT

A method comprising passing a culture solution including *Bacillus subtilis* or gene-recombinated Bacillus thereof through a pipe-like ceramic filter at a flow rate of 2 m/sec or less, the ceramic filter having a filter layer at an inner cylindrical surface thereof, the filter layer being made of spherical particles, and a surface roughness (Rmax) of the inner surface of the ceramic filter being 10 microns or less.

5 Claims, 2 Drawing Sheets

METHOD FOR FILTERING *BACILLUS SUBTILIS*

BACKGROUND OF THE INVENTION

This invention relates to an improved method for filtering *Bacillus subtilis* or gene-recombinated Bacillus thereof.

*Bacillus subtilis* is well-known as a kind of rod-shaped bacteria which have no bad effect on a human being. *Bacillus subtilis* is also used as host bacteria for genetic engineering from the viewpoint that *Bacillus subtilis* can easily excrete metabolite whereby recombinant gene products can be obtained.

In order to obtain recombinant gene products at a high efficiency, a culture solution including *Bacillus subtilis* or gene-recombinated Bacillus thereof in a culture container is forced to pass through a pipe-like filter so as to be filtered in a cross flow manner. Thus, only the metabolite is filtered or removed while the enriched solution is sent back to the culture container. The metabolite can be continuously produced.

A conventional preferred example of the filter as above-stated is a ceramic filter because:
(1) it is not stained;
(2) it is not solved out;
(3) it is not broken in filtration; and
(4) it can be disinfected by steam.

However, in case of the conventional ceramic filters, *Bacillus subtilis* is often disrupted during the cross-flow filtration because *Bacillus subtilis* is very weak. Such a problem mainly depends on characteristics of a ceramic filter to be used and filtration conditions.

SUMMARY OF THE INVENTION

The object of this invention is to provide a method for filtering *Bacillus subtilis* or gene-recombinated Bacillus thereof in which *Bacillus subtilis* is not disrupted in a cross-flow filtration.

According to a method of this invention, a pipe-like ceramic filter has a filter layer composed of spherical particles. The ceramic layer is positioned at an inner cylindrical surface of the ceramic filter. The surface roughness Rmax of the ceramic layer is 10 micron meters (hereinafter merely called microns) or less. The flow rate of a culture solution containing *Bacillus subtilis* is 2 m/sec or less when it passes through the ceramic filter.

In operation, *Bacillus subtilis* is not broken during the cross flow filtration because the inner surface of the ceramic filter is smooth and *Bacillus subtilis* contacts the inner surface of the ceramic filter at a low flow rate. If an inner surface of the ceramic filter is made of crushed particles having acute angles, and/or if the roughness of the inner surface is more than 10 microns, *Bacillus subtilis* is broken to a reasonable degree. In order that *Bacillus subtilis* in the fermenter softly contacts the inner surface of the ceramic filter during the filtration, it should flow at a low flow rate of 2 m/sec or less. If the flow rate is more than 2 m/sec, the microorganism cells can not be prevented from be broken.

DESCRIPTION OF THE EMBODIMENTS

Figure 1:
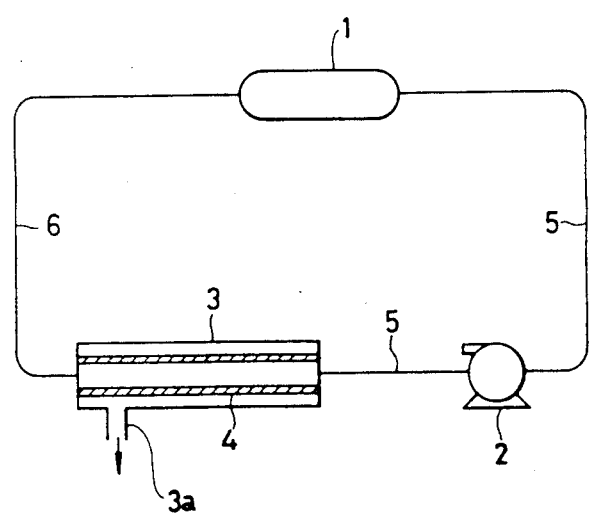
FIG. 1 is a schematic explanation view showing an apparatus for carrying out a method for filtering a culture solution according to this invention.

In FIG. 1, a container 1 contains a culture solution in which *Bacillus subtilis* is suspended. An example of the culture solution is an aqueous solution including 1 wt.% of polypeptone, 0.5 wt.% of yeast extract, 0.5 wt.% of NaCl and 10 wt.% of glucose and having pH 7. A filter casing 3 is connected to the container 1 through circulating lines 5 and 6. A pump 2 is placed in the circulating line 5. A ceramic filter 4 is set in the filter casing 3 in such a way that one end of the ceramic filter 4 is joined to the line 5 and the other end of the ceramic filter 4 is joined to the line 6.

In operation, if the pump 2 starts, the culture solution in the container 1 is sent through the line 5 and then passes through the ceramic filter 4 so as to be filtered in a cross flow manner. The filtrate is discharged from the filter casing 3 through a port 3a of the filter casing 3 into a tank (not shown). As a result the enriched solution is produced and sent back by way of the line 6 to the container 1.

A method for making the ceramic filter 4 will be explained. A high purity of alumina powder having a particle diameter of 10 to 30 microns is mixed with a binder and then formed in the shape of a pipe-like body having an outer diameter of 19 mm, an inner diameter of 15 mm and a thickness of 2 mm. This shaped body is heated so as to delete the binder. Next, a liquid containing a high purity of alumina powder having a particle diameter of 2 to 10 microns is coated uniformly on an inner cylindrical surface of the shaped body thereby to make a first coating and then dried. In addition, a liquid containing a high purity of relatively fine alumina powder is coated uniformly on the first coating thereby to make a second coating and then dried. Finally, the shaped body is heated at a temperature of 1,500° C. so as to produce a ceramic filter. The first and second coatings constitute a filter layer. The shaped body functions as a support layer for such a filter layer.

In such a method, as shown in Table 1, three types of particles are used as a starting material for such a filter layer at an inner surface of the ceramic filter. In case of a first type of particles Nos. 1 to 3 which are fine spherical particles, a roughness Rmax of the inner surface of the filter is 10 microns. In case of a second type of particles Nos. 4 to 6 which are fine crushed particles, a roughness Rmax of the inner surface is 10 microns. In case of a third type of particles which are relatively large spherical particles, a roughness Rmax of the inner surface is 100 microns.

Each of such ceramic filters is set in the apparatus of FIG. 1. The container 1 contains a culture solution having a concentration of 5 g/l with *Bacillus subtilis*. The culture solution is filtered at three different flow rates of 1.5 m/sec, 2.0 m/sec and 2.5 m/sec as shown in Table 1 by changing the output of the pump 2. After each filtration continues for 24 hours, the survival rate of *Bacillus subtilis* is measured by comparing biomas activity before filtered with that after filtered, which is shown in Table 1.

As can be seen from Table 1, the survival rate of the *Bacillus subtilis* is large if the filter layer is made of spherical particles, the inner surface of the filter has a roughness of 10 microns or less, and the flow rate is 2.0 m/sec or less, as shown in the examples Nos. 1 and 2.

Although *Bacillus subtilis* has been explained, gene-recombinated Bacillus can also be filtered with the same results according to this invention.

It is preferable that a ceramic filter 23 is back washed so as to maintain a good filtration efficiency.

Figure 2:
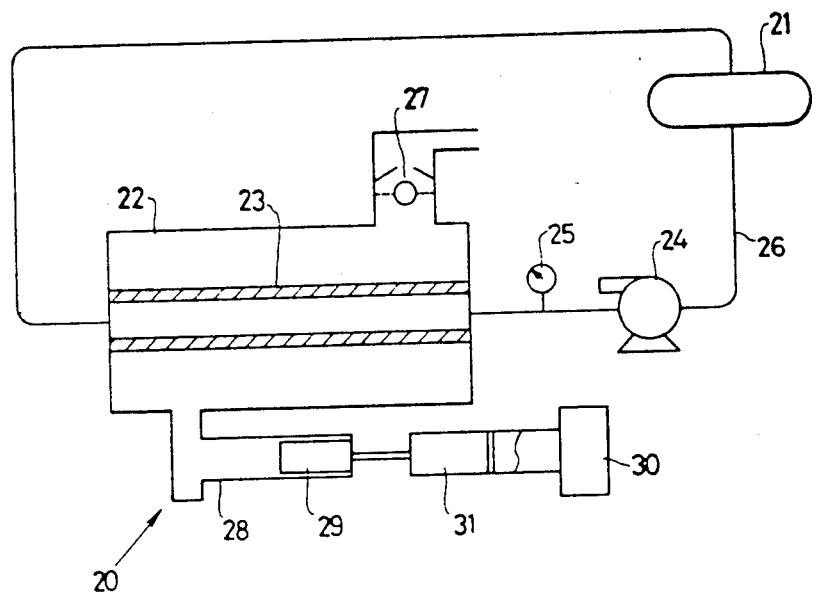
FIG. 2 is a schematic explanation view showing a further apparatus for carrying out a method of this invention.

FIG. 2 shows a further embodiment of this invention. A container 21 contains a culture solution which is the same as that of FIG. 1. Plural pipe-like ceramic filters 23 each having the same construction as that of FIG. 1 are arranged in parallel in a filter casing 22 which is connected to the container 21 through a circulating line 26. A pump 24 and a flow meter 25 are placed in the line 26. The culture solution is filtered when it flows through the passages of the ceramic filters 23 in a cross flow manner. The filtrate is sent through a float valve 27 to a tank (not shown) positioned out of the filter casing 22. The enriched solution is sent back to the container 21 for the cycling purpose.

The filter casing 22 is equipped with a back washing device 20 including a hydraulic pressure device consisting of a cylinder 28 and a piston 29 movable therein and an actuator 30. The piston 29 is actuated by the actuator 30 through an oil 31. The actuator 30 may be formed of a desired type such as an air type or a hydraulic type.

A method of back washing the ceramic filter 23 will be explained. The actuator 30 is actuated for a short time of 1 to 2 sec so as to move the piston 29 through the oil 31 in such a way that a pressure of the filtrate out of the filter 23 within the filter casing 22 becomes larger than that of the liquid in the filter 23. At the same time, the filtrate is moved into the filter 22 at a flow rate higher than the filtration rate so that the float valve 27 can be closed. Thus, the impurities attached to a filter surface of the ceramic filter 23 are removed therefrom and then suspended into the culture solution in the filter 22. Thus, one back washing step is completed.

After that, the piston 29 moves back to its original position in such a manner that a volume alteration of the cylinder 20 per a unit time always smaller than a filtration rate by the ceramic filter 23.

In such a method, the back washing can be carried out while the culture solution is being filtered. The impurities which have been removed from the ceramic filters 23 are suspended into the culture solution in the filters and not again attached onto the filters 23. Therefore, a high filtration efficiency can be maintained. In addition, as the filtrate is moved by the piston 29, there is no possibility that miscellaneous bacteria have effect on the filtrate.

Figure 3:
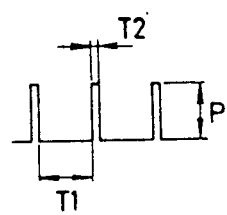
FIG. 3 shows a back washing curve.

FIG. 3 shows a filtration wave. $T_1$ denotes a filtration time. $T_2$ denotes a back washing time. P denotes a back washing pressure. A back washing time of about 0.2 sec or less is not enough to back wash the ceramic filter 23. A preferred back washing time is from 1 sec to 2 sec. The filtration step and the back washing step are repeated one after another.

TABLE 1

| No. | Type of Particles | Rmax of Inner Surface (micron) | Flow Rate (m/sec) | Survival Rate of *Bacillus Subtilis* (%) |
|---|---|---|---|---|
| 1 | Spherical Particles | 10 | 1.5 | 100 |
| 2 | Spherical Particles | 10 | 2.0 | 95 |
| 3 | Spherical Particles | 10 | 2.5 | 20 |
| 4 | Crushed Particles | 10 | 1.5 | 70 |
| 5 | Crushed Particles | 10 | 2.0 | 50 |
| 6 | Crushed Particles | 10 | 2.5 | 10 |
| 7 | Spherical Particles | 100 | 1.5 | 20 |
| 8 | Spherical Particles | 100 | 2.0 | 10 |
| 9 | Spherical Particles | 100 | 2.5 | 5 |

What is claimed is:

1. A method comprising passing a culture solution including *Bacillus subtilis* or gene-recombinated Bacillus thereof through a pipe-like ceramic filter at a flow rate of 2 m/sec or less, the ceramic filter having a filter layer at an inner cylindrical surface thereof, the filter layer being made of spherical particles, and a surface roughness (Rmax) of the inner surface of the ceramic filter being 10 microns or less.

2. The method of claim 1, wherein the filter layer consists of plural coatings made of alumina powder.

3. The method of claim 1, wherein the culture solution is contained in a container connected to a filter casing in which the ceramic filter is set in such a manner that the culture solution can be repeatedly circulated through the container and the ceramic filter.

4. The method of claim 1, wherein the culture solution is filtered by the ceramic filter in a cross flow manner.

5. The method of claim 4, wherein the ceramic filter is back washed while the culture solution is filtered.

* * * * *